No. 628,534. Patented July 11, 1899.
C. HAEFNER.
APPARATUS FOR FILTERING BEER, &c.
(Application filed Oct. 27, 1897.)
(No Model.) 2 Sheets—Sheet 2.
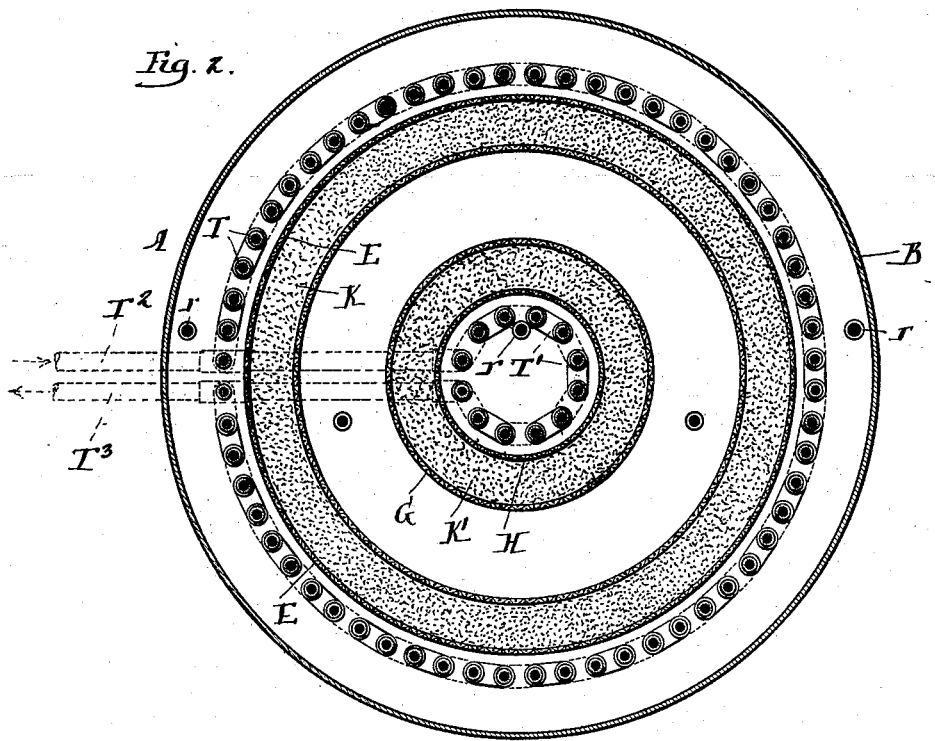
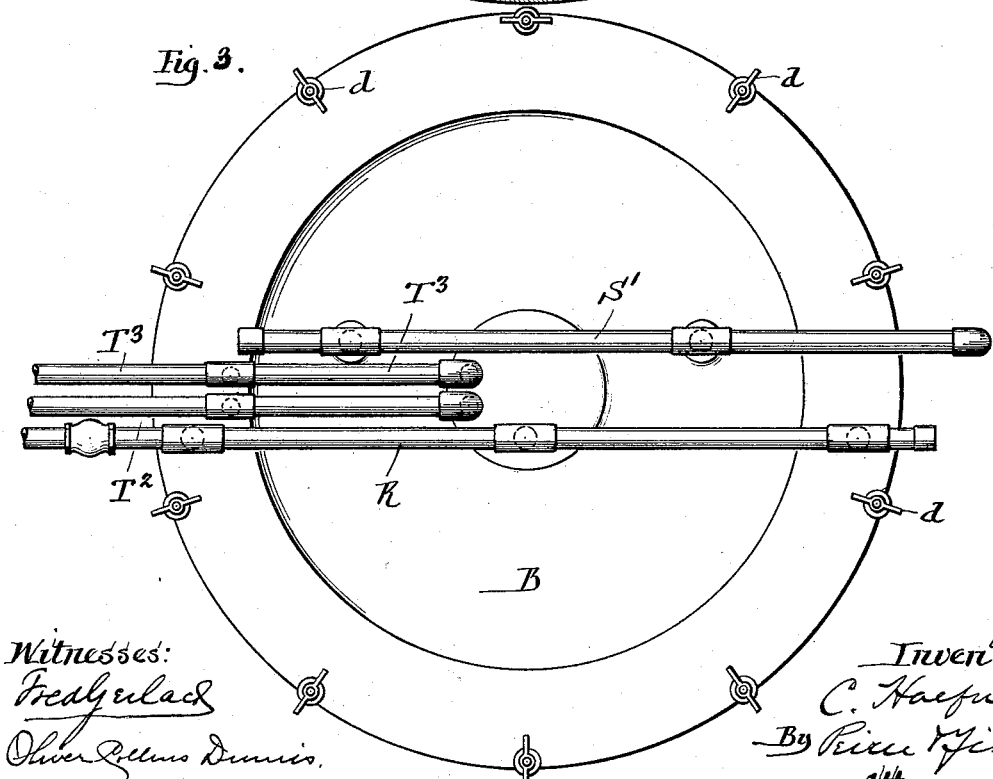

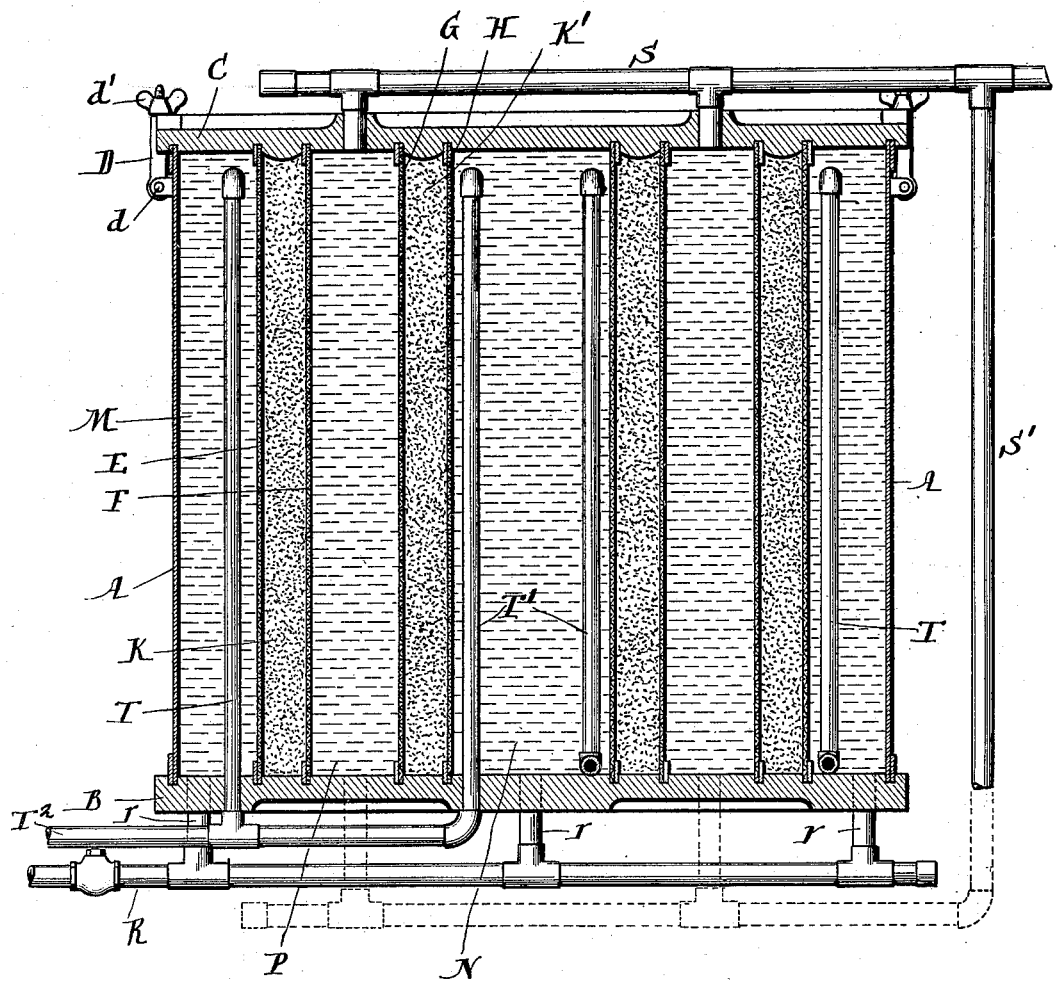

UNITED STATES PATENT OFFICE.

CARL HAEFNER, OF CHICAGO, ILLINOIS.

APPARATUS FOR FILTERING BEER, &c.

SPECIFICATION forming part of Letters Patent No. 628,534, dated July 11, 1899.

Application filed October 27, 1897. Serial No. 656,594. (No model.)

*To all whom it may concern:*

Be it known that I, CARL HAEFNER, a resident of the city of Chicago, in the county of Cook and State of Illinois, have invented certain new and useful Improvements in Apparatus for Filtering Beer and Like Liquors, of which I do declare the following to be a full, clear, and exact description, reference being had to the accompanying drawings, forming a part of this specification.

In the filtration of beer and like liquors it is of the utmost importance that the unfiltered beer shall be delivered to the filter mass through which it is to be passed in a very cold condition in order that the albuminoids carried by the beer in suspension shall be coagulated, so that they shall be more certainly arrested by the filter mass as the beer passes therethrough. It is also important that the beer within the filter shall be maintained at a low temperature in order that the liberation of the carbonic-acid gas, and consequent foaming of the beer, shall be prevented. It has heretofore been proposed to chill the beer before its passage into the filter; but while this chilling of the beer prior to its admission to the filter materially aids in the arresting of the albuminoids by the filter mass still when the beer enters the filter its temperature is raised by the heat abstracted from the filter mass and the material whereof the filter is composed, so that the foaming of the beer within the filter is not entirely prevented. By my present invention I provide the filter with chilling-pipes, located in the chamber or chambers for unfiltered beer and between the beer-delivery pipe and the filter mass, these chilling-pipes serving not only to reduce the temperature of the unfiltered beer, but also to maintain the body of beer within the filter, and as well also the filter mass, at such a low temperature that the danger of the beer foaming within the filter is obviated.

My invention may be applied to any suitable type of filter; but in the accompanying drawings I have illustrated the invention in connection with a filter such as is set forth in Letters Patent No. 575,478, granted to the National Filter & Carbonating Company, as my assignee, January 19, 1897.

Figure 1 is a view in central vertical section through a filter embodying my invention. Fig. 2 is a view in horizontal cross-section. Fig. 3 is an inverted plan view.

The filter shown comprises a vertical drum or casing A, that constitutes the body of the filter, this drum being closed by a bottom B and a top C. The bottom and top, B and C, are united to the body A, preferably by means of clamps D, that are pivoted, as at $d$, to lugs attached to the outside of the casing A, the free ends of these pivoted clamps being fitted with adjusting-nuts $d'$ in the usual manner, the clamps D being adapted to enter within slots formed in the projecting periphery of the top and bottom. The top and bottom of the filter are shown as provided upon their inner faces with a series of annular grooves to receive, respectively, the top and bottom edges of the cylindrical filter-plates E and F and G and H. The space between the filter-plates E and F forms a chamber for the filter mass K, while the annular space between the filter-plates G and H forms a chamber for the filter mass K'. The annular chamber between the filter-plate E and the casing A constitutes a chamber M for unfiltered beer, while the space N within the cylindrical filter-plate H also forms an unfiltered-beer chamber. The space between the filter-plates F and G forms the chamber P for filtered beer.

The unfiltered beer is delivered to the chambers M and N by a pipe R, having branches $r$ leading therefrom. The filtered beer is withdrawn from the filtered-beer chamber P by pipes S or S', as in the hereinbefore-mentioned Letters Patent No. 575,478, it being understood, of course, that the various pipes shown will be provided with the necessary stopcocks.

Within the unfiltered-beer chamber M is arranged a chilling-pipe T, that is preferably located in proximity to the filter-plate E and between this plate and the branch pipe $r$, by which the beer is delivered to the chamber N. In like manner also a chilling-pipe T' is placed within the unfiltered-beer chamber N, this pipe being preferably arranged in proximity to the filter-plate H and between such plate and the branch pipe whereby unfiltered beer is delivered to the chamber N. The chilling-pipes T and T' have their admission ends connected, as shown, with a suitable delivery-pipe $T^2$, through which the supply of cold brine or other chilling material will be supplied. Preferably the pipes T and T' are arranged in vertical series, as shown, although these pipes might be arranged in coils, if preferred. The discharge ends of the chilling-pipes T and T' are connected, as shown, to a discharge-pipe T³.

From the foregoing description it will be seen that by means of the delivery-pipe T² cold brine or the like will be admitted to the chilling-pipes T and T', passing thence away from the filter by the discharge-pipe T³. The unfiltered beer will be delivered into the chambers M and N, and passing between the sections of the chilling-pipe will then pass through the filter mass K into the filtered-beer chamber, while at the same time the unfiltered beer delivered to the central chamber N will pass between the vertical sections of the chilling-pipe T', through the filter mass K', and into the filtered-beer chamber P, whence it will be withdrawn in the usual manner. The chilling-pipes T and T' being located within the unfiltered-beer chambers, and preferably in proximity to the filter mass, serve not only to reduce the temperature of the unfiltered beer to the necessary degree, but also serve to maintain the body of beer, both filtered and unfiltered, and the filter mass at such low temperature that the foaming of the beer within the filter is avoided.

While I have illustrated my invention as applied to one form of filter, it is manifest that it may be employed in connection with other types of filters in which one or more unfiltered-beer chambers are used.

Having thus described my invention, what I claim as new, and desire to secure by Letters Patent, is—

1. A filter for beer or like liquor comprising a chamber for unfiltered beer, a filter mass, a chamber for filtered beer, pipes for delivering and withdrawing the beer to and from the filter and coils of chilling-pipe located within the unfiltered-beer chamber and in such position between the filter mass and the pipe whereby the beer is delivered, that the beer in passing from the unfiltered-beer chamber must pass between the coils of said chilling-pipe.

2. A filter for beer or like liquor comprising a chamber for unfiltered beer, a filter mass, a chamber for filtered beer, vertical coils of chilling-pipe located within the unfiltered-beer chamber adjacent the filter mass and a delivery-pipe arranged to discharge vertically into said unfiltered-beer chamber at the side of the chilling-pipe farthest from the filter mass.

3. A filter for beer or like liquor comprising the outer chamber M and the inner chamber N for unfiltered beer, the filter mass K and K' and their plates interposed between said inner and outer unfiltered-beer chambers and separated to form a filtered-beer chamber P in combination with a chilling-pipe T arranged within the chamber M and extending around and in proximity to the filter mass K, and a chilling-pipe T' arranged within the chamber N in proximity to the inner side of the filter mass K', and suitable delivery and discharge pipes for the beer and for the material supplied to the chilling-pipe, said beer-delivery pipes being arranged to deliver the beer in vertical direction at the sides of the chilling-pipe farthest from the filter masses.

CARL HAEFNER.

Witnesses:
   FRED GERLACH,
   ALBERTA ADAMICK.